United States Patent
Foerster et al.

(10) Patent No.: US 11,024,313 B2
(45) Date of Patent: *Jun. 1, 2021

(54) HOTWORD DETECTION ON MULTIPLE DEVICES

(71) Applicant: Google LLC, Mountain View, CA (US)

(72) Inventors: Jakob Nicolaus Foerster, San Francisco, CA (US); Alexander H. Gruenstein, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/860,419

(22) Filed: Apr. 28, 2020

(65) Prior Publication Data

US 2020/0258522 A1    Aug. 13, 2020

Related U.S. Application Data

(63) Continuation of application No. 16/454,451, filed on Jun. 27, 2019, now Pat. No. 10,665,239, which is a
(Continued)

(51) Int. Cl.
*G10L 15/00* (2013.01)
*G10L 15/22* (2006.01)
(Continued)

(52) U.S. Cl.
CPC .............. *G10L 15/22* (2013.01); *G10L 15/02* (2013.01); *G10L 15/26* (2013.01); *G10L 15/30* (2013.01);
(Continued)

(58) Field of Classification Search
CPC combination set(s) only.
See application file for complete search history.

(56) References Cited

U.S. PATENT DOCUMENTS

| 4,363,102 A | 12/1982 | Holmgren et al. |
| 5,897,616 A | 4/1999 | Kanevsky et al. |

(Continued)

FOREIGN PATENT DOCUMENTS

| CN | 102137085 A | 7/2011 |
| CN | 103645876 A | 3/2014 |

(Continued)

OTHER PUBLICATIONS

CN Notice of Allowance issued in Chinese Application No. 201580006769.7, dated Oct. 9, 2019, 7 pages (with English translation).

(Continued)

*Primary Examiner* — Vu B Hang
(74) *Attorney, Agent, or Firm* — Oblon, McClelland, Maier & Neustadt, L.L.P.

(57) ABSTRACT

Methods, systems, and apparatus, including computer programs encoded on a computer storage medium, for hotword detection on multiple devices are disclosed. In one aspect, a method includes the actions of receiving, by a computing device, audio data that corresponds to an utterance. The actions further include determining a likelihood that the utterance includes a hotword. The actions further include determining a loudness score for the audio data. The actions further include based on the loudness score, determining an amount of delay time. The actions further include, after the amount of delay time has elapsed, transmitting a signal that indicates that the computing device will initiate speech recognition processing on the audio data.

20 Claims, 3 Drawing Sheets

Related U.S. Application Data continuation of application No. 15/959,508, filed on Apr. 23, 2018, now Pat. No. 10,347,253, which is a continuation of application No. 15/190,739, filed on Jun. 23, 2016, now Pat. No. 9,990,922, which is a continuation of application No. 14/659,861, filed on Mar. 17, 2015, now Pat. No. 9,424,841.

(60) Provisional application No. 62/061,903, filed on Oct. 9, 2014.

(51) Int. Cl.
  *G10L 15/30* (2013.01)
  *G10L 15/26* (2006.01)
  *G10L 15/02* (2006.01)
  *G10L 25/03* (2013.01)
  *G10L 25/78* (2013.01)
  *G10L 15/08* (2006.01)
  *G10L 25/87* (2013.01)

(52) U.S. Cl.
  CPC ............. *G10L 25/03* (2013.01); *G10L 25/78* (2013.01); *G10L 15/08* (2013.01); *G10L 25/87* (2013.01); *G10L 2015/088* (2013.01); *G10L 2015/223* (2013.01); *G10L 2025/783* (2013.01)

(56) References Cited

U.S. PATENT DOCUMENTS

| | | | |
|---|---|---|---|
| 5,983,186 | A | 11/1999 | Miyazawa et al. |
| 6,141,644 | A | 10/2000 | Kuhn et al. |
| 6,567,775 | B1 | 5/2003 | Maali et al. |
| 6,826,159 | B1 | 11/2004 | Shaffer et al. |
| 6,931,375 | B1 | 8/2005 | Bossemeyer, Jr. et al. |
| 6,947,892 | B1 | 9/2005 | Bauer et al. |
| 7,222,072 | B2 | 5/2007 | Chang |
| 7,571,014 | B1 | 8/2009 | Lambourne et al. |
| 7,720,012 | B1 | 5/2010 | Borah et al. |
| 8,099,288 | B2 | 1/2012 | Zhang et al. |
| 8,194,624 | B2 | 6/2012 | Park et al. |
| 8,200,488 | B2 | 6/2012 | Kemp et al. |
| 8,209,174 | B2 | 6/2012 | Al-Telmissani |
| 8,214,447 | B2 | 7/2012 | Deslippe et al. |
| 8,340,975 | B1 | 12/2012 | Rosenberger |
| 8,588,949 | B2 | 11/2013 | Lambourne et al. |
| 8,670,985 | B2 | 3/2014 | Lindahl et al. |
| 8,713,119 | B2 | 4/2014 | Lindahl |
| 8,717,949 | B2 | 5/2014 | Crinon et al. |
| 8,719,009 | B2 | 5/2014 | Baldwin et al. |
| 8,719,018 | B2 | 5/2014 | Dinerstein |
| 8,775,191 | B1 | 7/2014 | Sharifi et al. |
| 8,805,890 | B2 | 8/2014 | Zhang et al. |
| 8,838,457 | B2 | 9/2014 | Cerra et al. |
| 8,938,394 | B1 | 1/2015 | Faaborg et al. |
| 8,996,372 | B1 | 3/2015 | Secker-Walker et al. |
| 9,142,218 | B2 | 9/2015 | Schroeter |
| 9,424,841 | B2 | 8/2016 | Foerster et al. |
| 9,812,126 | B2 | 11/2017 | Khan et al. |
| 9,990,922 | B2 * | 6/2018 | Foerster ................. G10L 15/22 |
| 10,347,253 | B2 | 7/2019 | Foerster et al. |
| 10,679,629 | B2 | 6/2020 | Pasko |
| 2003/0231746 | A1 | 12/2003 | Hunter et al. |
| 2004/0101112 | A1 | 5/2004 | Kuo |
| 2006/0074656 | A1 | 4/2006 | Mathias et al. |
| 2006/0085188 | A1 | 4/2006 | Goodwin et al. |
| 2007/0198262 | A1 | 8/2007 | Mindlin et al. |
| 2008/0085686 | A1 | 4/2008 | Kalik |
| 2008/0252595 | A1 | 10/2008 | Boillot |
| 2011/0184730 | A1 | 7/2011 | LeBeau et al. |
| 2011/0304648 | A1 | 12/2011 | Kim et al. |
| 2012/0084087 | A1 | 4/2012 | Yang et al. |
| 2013/0124207 | A1 | 5/2013 | Sarin et al. |
| 2013/0325479 | A1 | 12/2013 | Krueger et al. |
| 2014/0012578 | A1 | 1/2014 | Morioka |
| 2014/0088961 | A1 | 3/2014 | Woodward et al. |
| 2014/0107413 | A1 | 4/2014 | Tremaglio et al. |
| 2016/0104483 | A1 | 4/2016 | Foerster et al. |
| 2016/0260431 | A1 | 9/2016 | Newendorp et al. |
| 2018/0315424 | A1 | 11/2018 | Foerster et al. |

FOREIGN PATENT DOCUMENTS

| | | |
|---|---|---|
| CN | 103730116 A | 4/2014 |
| EP | 1215658 A2 | 6/2002 |
| JP | 2000310999 A | 11/2000 |
| JP | 2011227237 A | 11/2011 |
| WO | 1998040875 A1 | 9/1998 |
| WO | 2014107413 A1 | 7/2014 |

OTHER PUBLICATIONS

CN Office Action issued in Chinese Application No. 201580006769.7, dated Mar. 20, 2019, 11 pages (with English translation).

European Office Action issued in Application No. 15784808.6, dated Aug. 23, 2017, 5 pages.

Extended European Search Report issued in European Application No. 16193577.0, dated Nov. 23, 2016, 8 pages.

Extended European Search Report issued in European Application No. 18213657.2, dated Mar. 27, 2019, 10 pages.

International Preliminary Report on Patentability in International Application No. PCT/US2015/052870, dated Apr. 11, 2017, 8 pages.

International Search Report and Written Opinion in International Application No. PCT/US2015/052870, dated Dec. 4, 2015, 11 pages.

Japanese Notification of Reasons for Refusal issued in Japanese Application No. 2016-174371, dated Aug. 7, 2017, 4 pages (Machine Translation).

Japanese Notification of Reasons for Rejection issued in Japanese Application No. 2016-549271, dated Aug. 14, 2017, 9 pages (with English Translation).

Office Action issued in Korean Application No. 10-2016-7020950, dated Jul. 26, 2017, 8 pages (English Translation).

Office Action issued in Korean Application No. 10-2016-7026606 dated Jul. 20, 2017, 4 pages (English Translation).

Office Action issued in European Application No. 16193577.0, dated Jul. 4, 2018, 5 pages.

European Office Action dated Apr. 2, 2020 in European Patent Application No. 18 213 657.2, 5 pages.

European Office Action dated Dec. 23, 2020 in European Patent Application No. 18 213 657.2, 7 pages.

* cited by examiner

HOTWORD DETECTION ON MULTIPLE DEVICES

CROSS REFERENCE TO RELATED APPLICATIONS

This patent application is a continuation of, and claims priority under 35 U.S.C. § 120 from, U.S. patent application Ser. No. 16/454,451, filed on Jun. 27, 2019, which is a continuation of U.S. patent application Ser. No. 15/959,508, filed on Apr. 23, 2018, which is a continuation of U.S. patent application Ser. No. 15/190,739, filed on Jun. 23, 2016, which is a continuation of U.S. patent application Ser. No. 14/659,861, filed on Mar. 17, 2015, which claims priority under 35 U.S.C. § 119(e), to U.S. Provisional Application No. 62/061,903, filed on Oct. 9, 2014. The disclosures of these prior applications are considered part of the disclosure of this application and are hereby incorporated by reference in their entireties.

TECHNICAL FIELD

This specification generally relates to systems and techniques for recognizing the words that a person is speaking, otherwise referred to as speech recognition.

BACKGROUND

The reality of a speech-enabled home or other environment—that is, one in which a user need only speak a query or command out loud and a computer-based system will field and answer the query and/or cause the command to be performed—is upon us. A speech-enabled environment (e.g., home, workplace, school, etc.) can be implemented using a network of connected microphone devices distributed throughout the various rooms or areas of the environment. Through such a network of microphones, a user has the power to orally query the system from essentially anywhere in the environment without the need to have a computer or other device in front of him/her or even nearby. For example, while cooking in the kitchen, a user might ask the system "how many milliliters in three cups?" and, in response, receive an answer from the system, e.g., in the form of synthesized voice output. Alternatively, a user might ask the system questions such as "when does my nearest gas station close," or, upon preparing to leave the house, "should I wear a coat today?"

Further, a user may ask a query of the system, and/or issue a command, that relates to the user's personal information. For example, a user might ask the system "when is my meeting with John?" or command the system "remind me to call John when I get back home."

SUMMARY

For a speech-enabled system, the users' manner of interacting with the system is designed to be primarily, if not exclusively, by means of voice input. Consequently, the system, which potentially picks up all utterances made in the surrounding environment including those not directed to the system, must have some way of discerning when any given utterance is directed at the system as opposed, e.g., to being directed an individual present in the environment. One way to accomplish this is to use a hotword, which by agreement among the users in the environment, is reserved as a predetermined word that is spoken to invoke the attention of the system. In an example environment, the hotword used to invoke the system's attention are the words "OK computer." Consequently, each time the words "OK computer" are spoken, it is picked up by a microphone, conveyed to the system, which performs speech recognition techniques to determine whether the hotword was spoken and, if so, awaits an ensuing command or query. Accordingly, utterances directed at the system take the general form [HOTWORD] [QUERY], where "HOTWORD" in this example is "OK computer" and "QUERY" can be any question, command, declaration, or other request that can be speech recognized, parsed and acted on by the system, either alone or in conjunction with the server via the network.

According to one innovative aspect of the subject matter described in this specification, a computing device receives an utterance that is spoken by a user. The computing device determine a likelihood that the utterance includes a hotword and computes a loudness score of the utterance. Other computing devices in the near vicinity also receive the utterance, determine a likelihood that the utterance includes the hotword, and compute a loudness score of the utterance. Each computing device also calculates a delay based on the loudness score such that the length of the delay is inversely proportional to the loudness score. Because the computing device nearest the source of the utterance will typically have the highest loudness score, the nearest device should therefore have the shortest delay. After the delay associated with a given computing device has lapsed, the respective computing device will transmit a notification signal to the other computing devices unless it receives a notification signal during the delay period. Thus, the computing device with the smallest delay (and therefore the most likely to be nearest to the user) transmits a signal to the other computing devices to indicate that it will process additional audio following the hotword. In this instance, the transmitting computing device processes the additional audio following the hotword. If, during the delay, the computing devices receives a signal from one of the other devices indicating that another device will process the additional audio following the hotword, then the computing device ceases processing the audio.

In general, another innovative aspect of the subject matter described in this specification may be embodied in methods that include the actions of receiving, by a computing device, audio data that corresponds to an utterance; determining a likelihood that the utterance includes a hotword, determining a loudness score for the audio data; based on the loudness score, determining an amount of delay time; after the amount of delay time has elapsed, transmitting a signal that indicates that the computing device will initiate speech recognition processing on the audio data.

These and other embodiments can each optionally include one or more of the following features. The actions further include receiving, by the computing device, additional audio data that corresponds to an additional utterance; determining a second likelihood that the additional utterance includes the hotword; determining a second loudness score for the additional audio data; based on the second loudness score, determining a second amount of delay time; and before the amount of delay time has elapsed, receiving a second signal that indicates that (i) a second computing device will initiate speech recognition processing on the additional audio data and (ii) the computing device should not initiate speech recognition processing on the additional audio data. The actions further include based on receiving the second signal determining that an activation state of the computing device is an inactive state.

The actions further include based on transmitting the signal, determining that an activation state of the computing device is an active state. The signal includes an ultrasonic signal or short range radio signal. The signal is received by another computing device and indicates to the other computing device to not initiate speech recognition processing on the audio data. The actions further include based on determining a likelihood that the utterance includes a hotword, preparing to receive a signal that indicates that another computing device will initiate speech recognition processing on the audio data. The loudness score is proportional to the amount of delay time. The delay time is zero when the loudness score satisfies a threshold. The action of determining a loudness score for the audio data further includes determining that the likelihood that the utterance includes the hotword satisfies a likelihood threshold.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. Multiple devices can detect a hotword and only one device will respond to the hotword.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The specification describes a protocol based on loudness that allows a number of computing devices listening for a hotword to determine which device should respond. Advantageously, the protocol can be implemented based on local interactions, for example using audio signals or short range radio signals, and need not require any server side communication. This may be beneficial because using local interactions can permit negotiation of a response without incurring the latency of communicating with a server.

Figure 1:
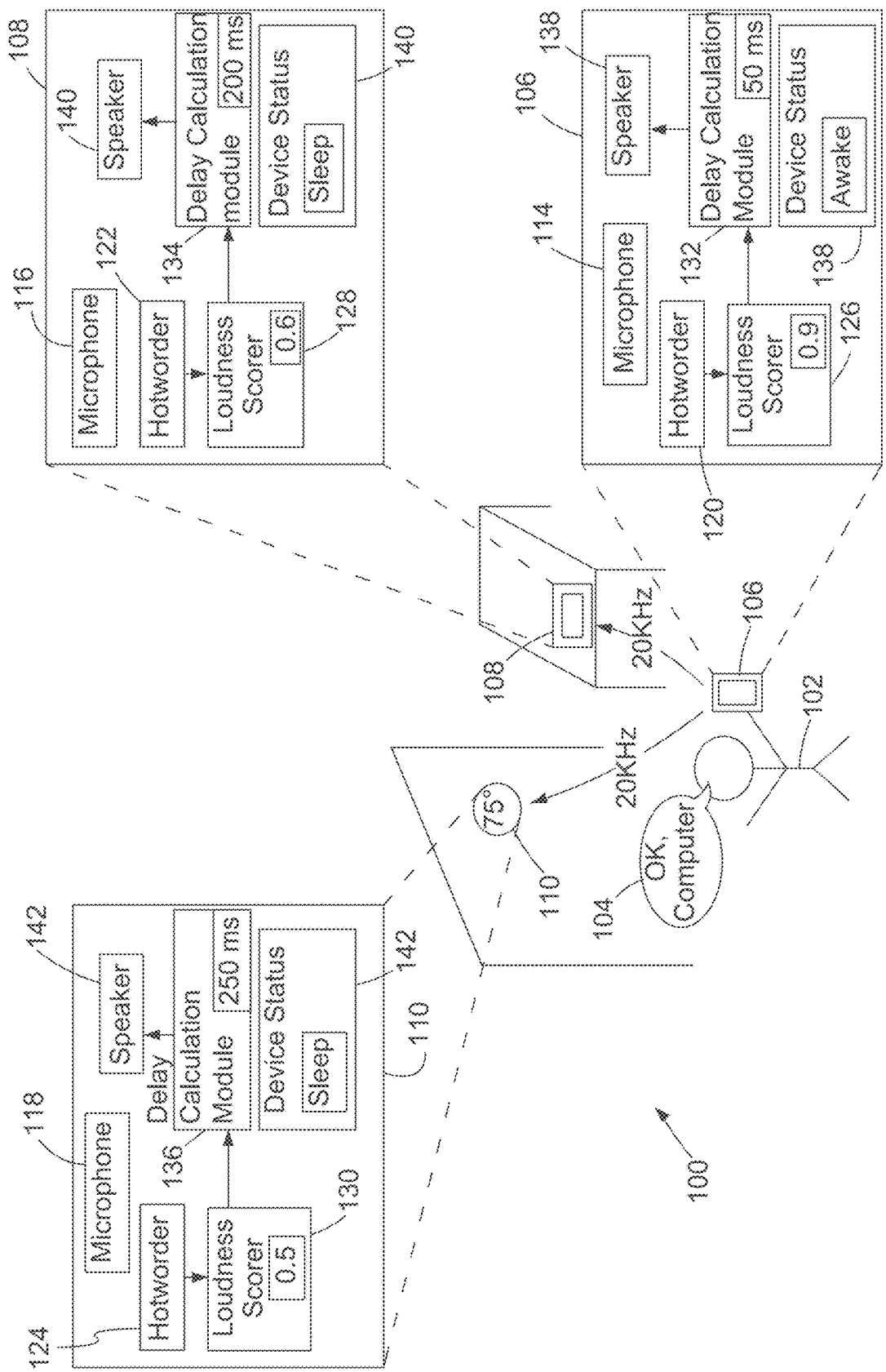
FIG. 1 is a diagram of an example system for hotword detection.

FIG. 1 is a diagram of an example system 100 for hotword detection. In general, the system 100 illustrates a user 102 speaking an utterance 104 that is detected by microphones of computing devices 106, 108, and 110. The computing devices 106, 108, and 110 process the utterance 104 to determine a likelihood that the utterance 104 includes a hotword, as well as to determine a loudness score for the utterance. The computing devices 106, 108, and 110 calculate a delay time that is proportional to the loudness score. Once one of the delay times for a computing device has elapsed, that computing device transmits a signal to the other computing devices. The signal indicates to the other computing devices that the transmitting computing device will perform speech recognition on audio data that corresponds to the utterance.

In more detail, user 102 speaks the utterance 104, "OK computer," and the computing devices 106, 108, and 110 receive the utterance 104 through a respective audio input device such as a microphone. Computing device 106 is a phone that the user 102 is holding in the user's hand. Computing device 108 is a tablet that is located on a table. Computing device 110 is a thermostat located on a wall. The computing device 106 is closest to the user, then the computing device 108 is the next closest, and finally the computing device 110 is farthest from the user. Each computing device 106, 108, and 110 includes a microphone 114, 116, or 118. Each microphone provides audio data to a respective audio subsystem. The audio subsystem buffers, filters, and digitizes the audio data received from the microphone. In some implementations, each computing device may also perform endpointing and speaker identification on the audio data. In some implementations, the computing devices 106, 108, and 110 may be any device that can receive and process audio data such as the devices described below with respect to FIG. 3.

Each audio subsystem provides the processed audio data to a hotworder such as hotworder 120, 122, or 124. The respective hotworder performs a classification process on the processed audio data that may be informed or trained using known utterances of the hotword. The respective hotworder computes a likelihood that the utterance 104 includes a hotword. The respective hotworder may extract audio features from the processed audio data such as filterbank energies or mel-frequency cepstral coefficients. The respective hotworder may use classifying windows to process these audio features such as by using a support vector machine or a neural network. Based on the processing of the audio features, the respective hotworder computes a likelihood that the utterance 104 includes a hotword. In some implementations, the likelihood may be reflected by a confidence score. The confidence score may be normalized to a scale of one to one hundred, with a higher number indicating a greater confidence that the utterance 104 includes a hotword.

In some implementations, the respective hotworder compares the confidence score to a threshold. If the confidence score satisfies a threshold, then the computing device continues processing the audio data. If the confidence score does not satisfy a threshold, then the computing device ceases processing of the audio data. For example, if the confidence score is 0.8 and the threshold is 0.7, then the computing device will continue to process the audio data. The confidence score might be 0.8 when the audio data corresponds to "OK, computer." If the confidence score is 0.5 and the threshold is 0.7, then the computing device will cease to process the audio data. The confidence score might be 0.5 when the audio data corresponds to "dinner time."

The hotworder provides the audio data to a loudness scorer. The loudness scorer computes a loudness score for the audio data. Typically the loudness score will be a reflection of the distance that the user is from each computing device. For example, the loudness score computed by loudness scorer 126 of the computing device 106 may be 0.9. The loudness score computed by the loudness scorer 128 of the computing device 108 may be 0.6. The loudness score computed by the loudness scorer 130 of the computing device 110 may be 0.5. In some implementations, the audio subsystem provides the audio data to the loudness scorer. In this instance, the hotworder may compute a likelihood that the utterance 104 includes a hotword in parallel with the loudness scorer computing a loudness score.

The loudness scorer may compute the loudness of the audio data using any suitable technique that generates a value proportional to the loudness, for example one or a combination of the following techniques. One technique may be to calculate the maximum or average sound pressure or sound pressure level as received by the microphone when the user is speaking the utterance. The higher the sound pressure or sound pressure level, the greater the loudness. A second technique is to calculate the root mean square of the audio data. The higher the root mean square value of the audio data, the higher the loudness. A third technique is to calculate the sound intensity of the audio data. The higher the sound intensify of the audio data, the higher the loudness. A fourth technique is to calculate the sound power of the audio data. The higher the sound power, the higher the loudness.

The loudness scorer provides the loudness score to a delay calculation module. Based on the loudness score, the module calculates a delay time that the computing device should wait before further processing the audio data and notifying other computing devices that the computing device will be processing the audio data. For example, loudness scorer 126 provides a loudness score of 0.9 to the delay calculation module 132, and the module 132 computes a delay time of fifty milliseconds. The loudness scorer 128 provides a loudness score of 0.6 to the delay calculation module 134, and the delay calculation module 134 computes a delay time of two hundred milliseconds. The loudness scorer 130 provides a loudness score of 0.5 to the delay calculation module 136, and the delay calculation module 138 computes a delay time of two hundred milliseconds.

A timer then counts down the delay time and once the delay time has elapsed, the timer causes the computing device to transmit a signal to a speaker of the computing device for the speaker to emit a notification signal. The timer may be included in the delay calculation module, or the timer may be separate from the delay calculation module. The notification signal may be, for example, an ultrasonic or audible audio signal, or a short range radio signal such as Bluetooth. The notification signal is received by the other computing devices and indicates to the other computing devices that the computing device that emitted the notification signal will handle processing the audio data. For example, the delay calculation module 132 waits for fifty milliseconds before instructing the speaker 138 to emit a notification signal. Because computing devices 108 and 110 receive the notification signal before their timers finish counting down their respective delay time, the computing device 108 and 110 cease processing of the audio data and speakers 140 and 142 do not emit a notification signal. In some implementations, the notification signal may include a particular frequency and/or pattern. For example, a notification signal may be twenty kilohertz to indicate that a computing device will perform speech recognition on the audio data.

In some implementations, upon emitting the notification signal, the computing device 106 may also set its device status 138. Because the computing device 106 is the one processing the audio data, device status 138 is set to active or "awake." The device statuses 140 and 142 of computing devices 108 and 110 are set to inactive or "sleep" because neither one of the devices is performing further processing the audio data.

In some implementations, the device status of the computing devices may be unaffected. The computing device that measures the loudest audio data and in turn emits the notification signal soonest may begin to further process the audio data while other computing devices remain awake or enter an awake state. For example, a user 102 may be watching a movie on the computing device 108 and have the computing device 106 in the user's hand. When the user 102 speaks "OK computer," the computing device 106 detects the audio data, and after fifty milliseconds, the computing device 106 emits a notification signal to indicate that the computing device 106 will further process the audio data. The computing device 108 receives the notification signal and continues to play the movie.

In some implementations, the computing device may begin to perform speech recognition on the audio data before emitting or receiving a notification signal. Performing recognition before emitting or receiving a notification signal allows the computing device to quickly complete speech recognition of the utterance. For example, if the utterance is "OK, computer, call Alice," then the computing device can begin to recognize that the user spoke "call Alice" so that the computing device can respond sooner if the computing device remains in an active state. If the device status of the computing device is inactive, then the computing device may not display an indication that it performed speech recognition on "call Alice." In FIG. 1, using this technique would cause computing devices 106, 108, and 110 to preform speech recognition on the audio data and any audio data following the audio data. When the speaker 138 transmits the notification signal, then the computing device 106 will continue performing speech recognition and display the results. When microphones 116 and 118 receive the notification signal, then the computing devices 106 and 108 will cease performing speech recognition and not display the results. The computing devices 106 and 108 appear to the user 102 as having remained in the inactive state.

Figure 2:
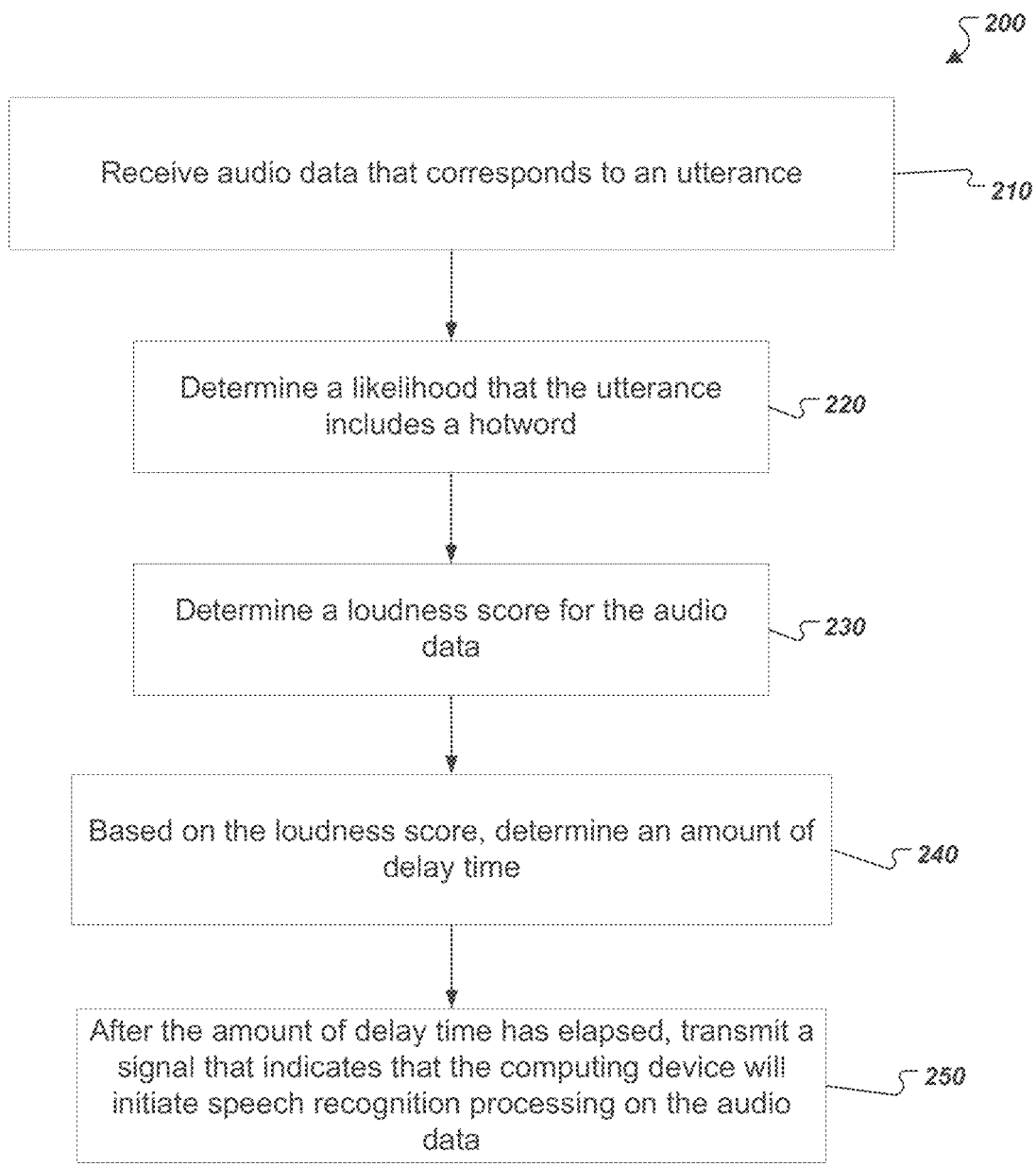
FIG. 2 is a diagram of an example process for hotword detection.

FIG. 2 is a diagram of an example process 200 for hotword detection. The process 200 may be performed by a computing device such as the computing device 108 from FIG. 1. The process 200 computes: (i) a likelihood that an utterance includes a hotword; and (ii) a loudness score for audio data corresponding to the utterance. The process 200 computes a delay time that the computing device waits before notifying other computing devices that the computing device is processing the audio data.

The computing device receives audio data that corresponds to an utterance (210). A user speaks the utterance and a microphone of the computing device receives the audio data of the utterance. The computing device processes the audio data by buffering, filtering, endpointing, and digitizing the audio data. As an example, the user may utter "Ok, computer" and the microphone of the computing device will receive the audio data that corresponds to "Ok, computer." An audio subsystem of the computing device will sample, buffer, filter, and endpoint the audio data for further processing by the computing device.

The computing device determines a likelihood that the utterance includes a hotword (220). The computing device determines the likelihood that the utterance includes a hotword by comparing the audio data of the utterance to a group of audio samples that include the hotword and/or by analyzing the audio characteristics of the audio data of the utterance. In some implementations, the likelihood that the utterance includes a hotword may be represented by a confidence score. The confidence score may be normalized to a scale from one to one hundred where one hundred indicates the highest likelihood that the utterance includes a hotword. The computing device may compare the confidence score to a threshold. If the confidence score satisfies the threshold, then the computing device will continue processing the audio data. If the confidence score does not satisfy the threshold, then the computing device will cease processing of the audio data. In some implementations, the confidence score should be higher than the threshold for the computing device to continue processing. For example, if the confidence score is 0.9 and the threshold is 0.7, then the computing device will continue processing the audio data.

In some implementations, the computing device prepares to receive a signal that indicates that another computing device will initiate speech recognition processing on the audio data. To receive the signal, the computing device may ensure that the microphone of the computing device remains active, that a short range radio receiver is active, or that another radio such a local area wireless radio is active. It may be necessary for the computing device to prepare to receive the signal so that the computing device does not display results from speech recognition of the audio data when another computing device displays the results.

The computing device determines a loudness score for the audio data (230). The computing device may use one or a combination of the following techniques to calculate the loudness score for the audio data. One technique may be to calculate the sound pressure or sound pressure level as received by the microphone when the user is speaking the utterance. The higher the sound pressure or sound pressure level the higher the loudness. A second technique is to calculate the root mean square of the audio data. The higher the root mean square value of the audio data, the higher the loudness. A third technique is to calculate the sound intensity of the audio data. The higher the sound intensity of the audio data, the higher the loudness. A fourth technique is to calculate the sound power of the audio data. The higher the sound power, the higher the loudness. The loudness of the audio data received by the computing device may reflect a distance between the computing device and the source of the audio. For direct path signal propagation, the loudness is approximately inversely proportional to the square of the distance between the source and the receiver. In some implementations, the computing device only computes a loudness score if the likelihood that the utterance includes a hotword satisfies a threshold. If the utterance is not likely to include a hotword, then the computing device does not compute a loudness score.

The computing device determines an amount of delay time based on the loudness score (240). In some implementations, the delay time is inversely proportional to the loudness score. For example, a loudness score of ninety may correspond to a delay time of fifty milliseconds, and a loudness score of 0.6 may correspond to a delay time of two hundred milliseconds. In some implementations, if the loudness score does not satisfy a threshold, then there is no delay time, i.e., the computing device ceases processing the audio signal and will not transmit a notification at any time. In some implementations, if the loudness exceeds a threshold, the delay time will be 0, meaning that the corresponding computing device continues processing the audio signal and immediately sends out the notification signal to other devices. These thresholds may be determined using any suitable method such as empirically by experimentation.

The computing device transmits a notification signal that indicates that the computing device will initiate speech recognition processing on the audio data after the amount of delay time has elapsed (250). Once the computing device computes a delay time, a timer of the computing device counts down the delay time. When the delay time has elapsed, the computing device transmits a signal such as an ultrasound, a short range radio signal, or a local area wireless signal to other computing devices that are nearby to indicate that the computing device is initiating speech recognition processing on the audio data. For example, the computing device is in an active or "awake" state after receiving the audio data and the other computing devices are in an inactive or "sleep" state after receiving the signal.

In some implementations, the computing device receives a signal from another computing device that indicates that the other computing device will initiate speech recognition processing on the audio data. In this instance, the computing device receives the signal while the timer is counting down the delay time. When the computing device receives the signal, the computing device will not perform or not continue to perform speech recognition on the audio data. For example, if the computing device computes a delay time of two hundred milliseconds and while the timer of the computing device is counting down the two hundred milliseconds, the computing device receives a notification signal from another computing device, then the computing device will not perform speech recognition on the audio data. The computing device may now be in an inactive or "sleep" state after receiving the signal.

In some implementations, the computing device detects other computing devices that are nearby and that are capable of responding to a hotword. The computing device may periodically transmit an ultrasound or radio signal that requests a response. For example, the computing device may transmit an ultrasound that is 20.5 kilohertz when searching for nearby computing devices that recognize hotwords. In response, computing devices that receive the 20.5 kilohertz ultrasound may respond with a twenty-one kilohertz ultrasound. When the computing device does not detect nearby computing devices that recognize hotwords, the computing device may not compute a loudness score and delay time before performing speech recognition on the audio data.

In some implementations, the computing device may identify other computing devices that belong to the same user. While setting up a new computing device, part of the setup procedure may be to identify other computing devices that belong to the same user. This may be accomplished by detecting other devices that the user is logged into. Once the computing device identifies another computing device, the computing devices may exchange data that signifies an ultrasonic frequency pattern or bit stream that the computing devices can exchange when identifying a hotword. The ultrasonic frequency pattern may be transmitted through a speaker and the bit stream may be transmitted through a radio. For example, a user may be setting up a thermostat and part of the set up process is to search for other computing device that are nearby and that respond to hotwords. The thermostat may identify a phone and a tablet that the user is logged into. As an example, the thermostat, phone, and tablet may exchange data using a ramped frequency pattern of one millisecond at 20.5 kilohertz, one millisecond at twenty-one kilohertz, and one millisecond at 21.5 kilohertz. The pattern allows the computing device that initiates speech recognition processing on the audio data to notify other computing device that belong to the user and not to suppress speech recognition on other devices that may belong to another user.

Figure 3:
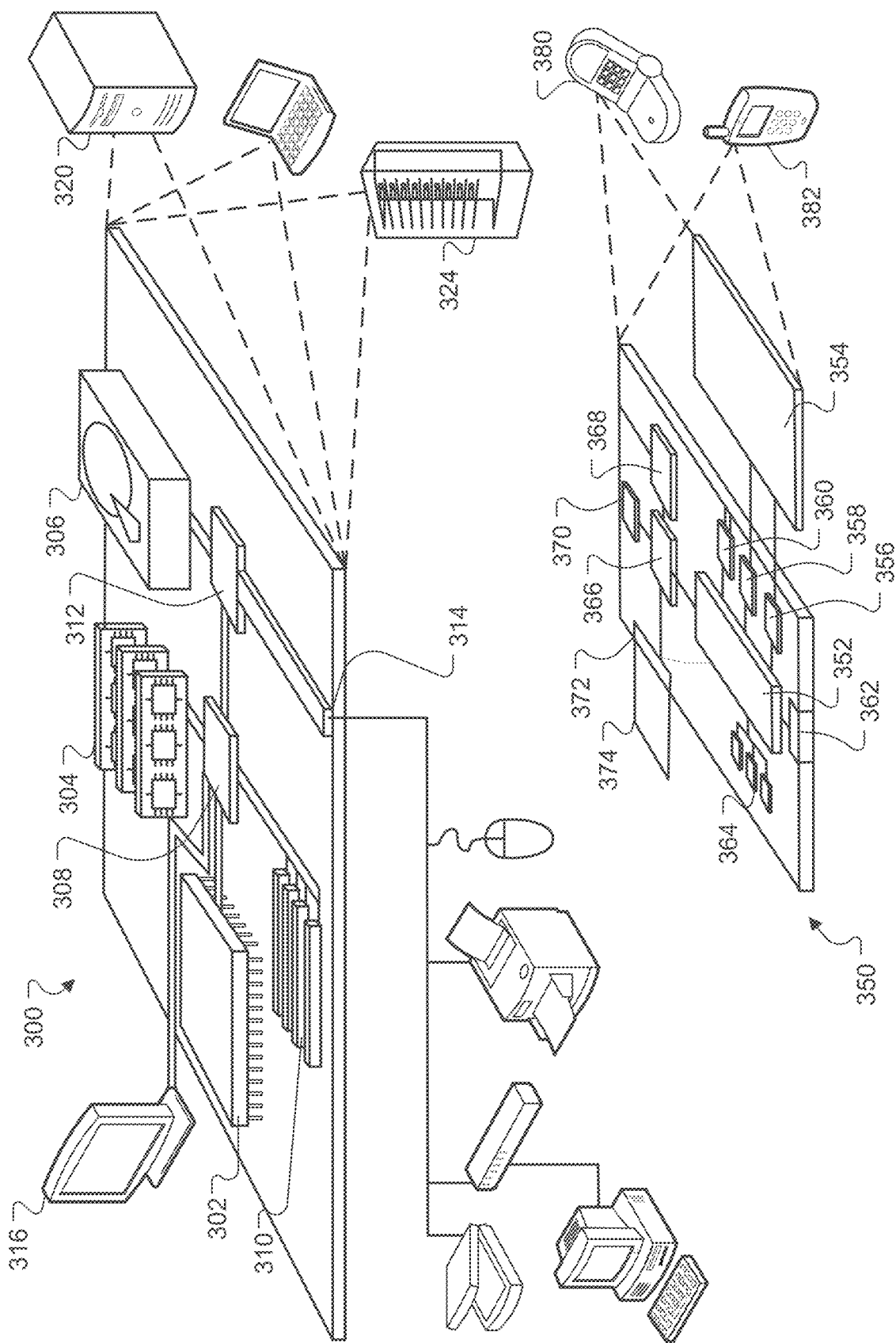
FIG. 3 shows an example of a computing device and a mobile computing device.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example flash memory and/or NVRAM memory (non-volatile random access memory), as discussed below. In some implementations, instructions are stored in an information carrier, that, the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method comprising:
   activating, by a first computing device configured to respond to voice commands that are preceded by a predefined hotword, a respective short range radio receiver on the first computing device to transmit and receive short range radio signals to and from a second computing device, the second computing device in proximity to the first computing device and is also configured to respond to voice commands that are preceded by the same, predefined hotword;

receiving, at the first computing device, audio data that corresponds to an utterance of the predefined hotword followed by a voice command;

determining, by the first computing device, that the audio data includes the predefined hotword;

in response to determining that the audio data includes the predefined hotword, transitioning, by the first computing device, from operating in an inactive state, to operating in an active state;

while the first computing device is operating in the active state, receiving, at the respective short range radio receiver of the first computing device, from the second computing device, a short range radio signal indicating that the second computing device will respond to the voice command in the audio data that follows the predefined hotword; and in response to receiving the short range radio signal from the second computing device, transitioning, by the first computing device, from operating in the active state, to operating in the inactive state.

2. The method of claim 1, wherein, while the first computing device is operating in the active state, the first computing device is configured to process the voice command in the audio data that follows the predefined hotword.

3. The method of claim 1, further comprising, in response to receiving the short range radio signal from the second computing device, ceasing, by the first computing device, processing the voice command in the audio data that follows the predefined hotword.

4. The method of claim 1, further comprising, in response to receiving the short range radio signal from the second computing device, bypassing, by the first computing device, responding to the voice command in the audio data that follows the predefined hotword.

5. The method of claim 1, further comprising:
in response to determining that the audio data includes the predefined hotword, determining, by the first computing device, a first score reflecting a loudness of the audio data received at the first computing device; and
determining, by the first computing device, a duration of a delay period based on the first score reflecting the loudness of the audio data received at the first computing device,
wherein the first computing device receives the short range radio signal from the second computing device during the duration of the delay period.

6. The method of claim 5, wherein the second computing device is configured to:
receive the audio data;
determine that the audio data includes the predefined hotword;
determine a second score reflecting a loudness of the audio data received at the second computing device; and
respond to the voice command in the audio data that follows the predefined hotword based on the second score.

7. The method of claim 6, wherein the second score is greater than the first score to indicate that the loudness of the audio data received at the second computing device is greater than the loudness of the audio data received at the first computing device.

8. The method of claim 1, wherein receiving the audio data comprises receiving the audio data via a microphone of the first computing device.

9. The method of claim 1, wherein the short range radio signal comprises a Bluetooth signal.

10. The method of claim 1, wherein:
the first computing device comprises a mobile phone associated with a user that spoke the utterance; and
the second computing device comprises a digital assistant device associated with the user that spoke the utterance.

11. A first computing device comprising:
data processing hardware; and
memory hardware in communication with the data processing hardware and storing instructions that when executed on the data processing hardware cause the data processing hardware to perform operations comprising:
activating a respective short range radio receiver on the first computing device to transmit and receive short range radio signals to and from a second computing device in proximity to the first computing device, wherein the first and second computing devices are both configured to respond to voice commands that are preceded by a same, predefined hotword;
receiving audio data that corresponds to an utterance of the predefined hotword followed by a voice command;
determining that the audio data includes the predefined hotword;
in response to determining that the audio data includes the predefined hotword, transitioning, from operating in an inactive state, to operating in an active state;
while the first computing device is operating in the active state, receiving, at the respective short range radio receiver of the first computing device, from the second computing device, a short range radio signal indicating that the second computing device will respond to the voice command in the audio data that follows the predefined hotword; and
in response to receiving the short range radio signal from the second computing device, transitioning, from operating in the active state, to operating in the inactive state.

12. The first computing device of claim 11, wherein, while the first computing device is operating in the active state, the first computing device is configured to process the voice command in the audio data that follows the predefined hotword.

13. The first computing device of claim 11, wherein the operations further comprise, in response to receiving the short range radio signal from the second computing device, ceasing processing the voice command in the audio data that follows the predefined hotword.

14. The first computing device of claim 11, wherein the operations further comprise, in response to receiving the short range radio signal from the second computing device, bypassing responding to the voice command in the audio data that follows the predefined hotword.

15. The first computing device of claim 11, wherein the operations further comprise:

in response to determining that the audio data includes the predefined hotword, determining a first score reflecting a loudness of the audio data received at the first computing device; and determining a duration of a delay period based on the first score reflecting the loudness of the audio data received at the first computing device, wherein the first computing device receives the short range radio signal from the second computing device during the duration of the delay period.

16. The first computing device of claim 15, wherein the second computing device is configured to:

receive the audio data;

determine that the audio data includes the predefined hotword;

determine a second score reflecting a loudness of the audio data received at the second computing device; and respond to the voice command in the audio data that follows the predefined hotword based on the second score.

17. The first computing device of claim 16, wherein the second score is greater than the first score to indicate that the loudness of the audio data received at the second computing device is greater than the loudness of the audio data received at the first computing device.

18. The first computing device of claim 11, wherein receiving the audio data comprises receiving the audio data via a microphone of the first computing device.

19. The first computing device of claim 11, wherein the short range radio signal comprises a Bluetooth signal.

20. The first computing device of claim 11, wherein:

the first computing device comprises a mobile phone associated with a user that spoke the utterance; and the second computing device comprises a digital assistant device associated with the user that spoke the utterance.

* * * * *